United States Patent
Kurtz, II et al.

(10) Patent No.: US 10,380,916 B2
(45) Date of Patent: Aug. 13, 2019

(54) INTERACTIVE BLACK HOLE SIMULATOR AND MEASUREMENT DEVICE

(71) Applicants: James Alan Kurtz, II, Dade City, FL (US); Matthew Ryan Kurtz, Dade City, FL (US)

(72) Inventors: James Alan Kurtz, II, Dade City, FL (US); Matthew Ryan Kurtz, Dade City, FL (US)

(*) Notice: Subject to any disclaimer, the term of this patent is extended or adjusted under 35 U.S.C. 154(b) by 294 days.

(21) Appl. No.: 15/482,177

(22) Filed: Apr. 7, 2017

(65) Prior Publication Data
US 2017/0365190 A1    Dec. 21, 2017

Related U.S. Application Data

(60) Provisional application No. 62/351,145, filed on Jun. 16, 2016.

(51) Int. Cl.
| G09B 27/00 | (2006.01) |
| G09B 23/08 | (2006.01) |
| G09B 9/00  | (2006.01) |
| G09B 23/06 | (2006.01) |

(52) U.S. Cl.
CPC ............. *G09B 23/08* (2013.01); *G09B 9/00* (2013.01); *G09B 23/06* (2013.01)

(58) Field of Classification Search
USPC ................. 434/276, 284, 300, 301
See application file for complete search history.

(56) References Cited

U.S. PATENT DOCUMENTS

| 3,478,466 A * | 11/1969 | Conner ............... A63H 33/26 273/456 |
| 5,060,947 A * | 10/1991 | Hall ..................... A63F 9/34 273/138.2 |
| 5,695,344 A * | 12/1997 | Tomasello ............ G09B 23/20 434/281 |
| 5,842,902 A * | 12/1998 | Liff ...................... A63H 33/26 446/130 |
| 6,015,296 A * | 1/2000 | Fenkanyn ............ G09B 23/06 434/276 |
| 6,547,567 B1 * | 4/2003 | Vincent ............... G09B 23/08 434/300 |
| 6,969,260 B1 * | 11/2005 | Lally .................... G09B 23/28 434/302 |
| 9,478,336 B2 * | 10/2016 | Henning, III ......... H01F 7/0242 |
| 2006/0073976 A1 * | 4/2006 | Pohlman ............... G09B 19/00 505/166 |

* cited by examiner

*Primary Examiner* — Kurt Fernstrom
(74) *Attorney, Agent, or Firm* — Dunlap Bennett & Ludwig PLLC

(57) ABSTRACT

An interactive black hole orbital simulator includes a base. The base includes a first end, a second end, an upper surface and a lower surface. The upper surface includes a guide running from the first send to the second end. A vertical shaft extends from the second end of the base. A horizontal shaft extends from a top end of the vertical shaft towards the first end of the base. The present invention further includes a slide frame and an orbital displacement disc. The slide frame includes a bottom and a top. A rail is formed on the bottom. The rail slidably engages with the guide. A first magnet is secured to the top. The orbital displacement disc hangs from the horizontal shaft above the slide frame by at least one cord. The orbital displacement ring includes a second magnet.

8 Claims, 3 Drawing Sheets

INTERACTIVE BLACK HOLE SIMULATOR AND MEASUREMENT DEVICE

CROSS-REFERENCE TO RELATED APPLICATION

This application claims the benefit of priority of U.S. provisional application Ser. No. 62/351,145, filed Jun. 16, 2016, the contents of which are herein incorporated by reference.

BACKGROUND OF THE INVENTION

The present invention relates to an interactive blackhole simulator and measurement device.

A black hole is a region of spacetime exhibiting such strong gravitational effects that nothing—not even particles and electromagnetic radiation such as light—can escape from inside it. The theory of general relativity predicts that a sufficiently compact mass can deform spacetime to form a black hole. The boundary of the region from which no escape is possible is called the event horizon. Although the event horizon has an enormous effect on the fate and circumstances of an object crossing it, no locally detectable features appear to be observed. In many ways a black hole acts like an ideal black body, as it reflects no light. Currently, characteristics of black holes are relatively unknown as black holes are located at a great distance from the earth.

As can be seen, there is a need for an interactive blackhole simulator and measurement device.

SUMMARY OF THE INVENTION

In one aspect of the present invention, a black hole simulator comprises: a base comprising a first end, a second end, an upper surface and a lower surface, wherein the upper surface comprises a guide running from the first send to the second end and the lower surface supports the simulator in an upright position when resting on a surface; a vertical shaft extending from the second end of the base; a horizontal shaft extending from a top end of the vertical shaft towards the first end; a slide frame comprising a bottom and a top, wherein the bottom comprises a rail slidably engaged with the guide and the top comprises a first magnet; and an orbital displacement disc hanging from the horizontal shaft above the slide frame by at least one cord, wherein the orbital displacement disc comprises a second magnet.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Figure 1:
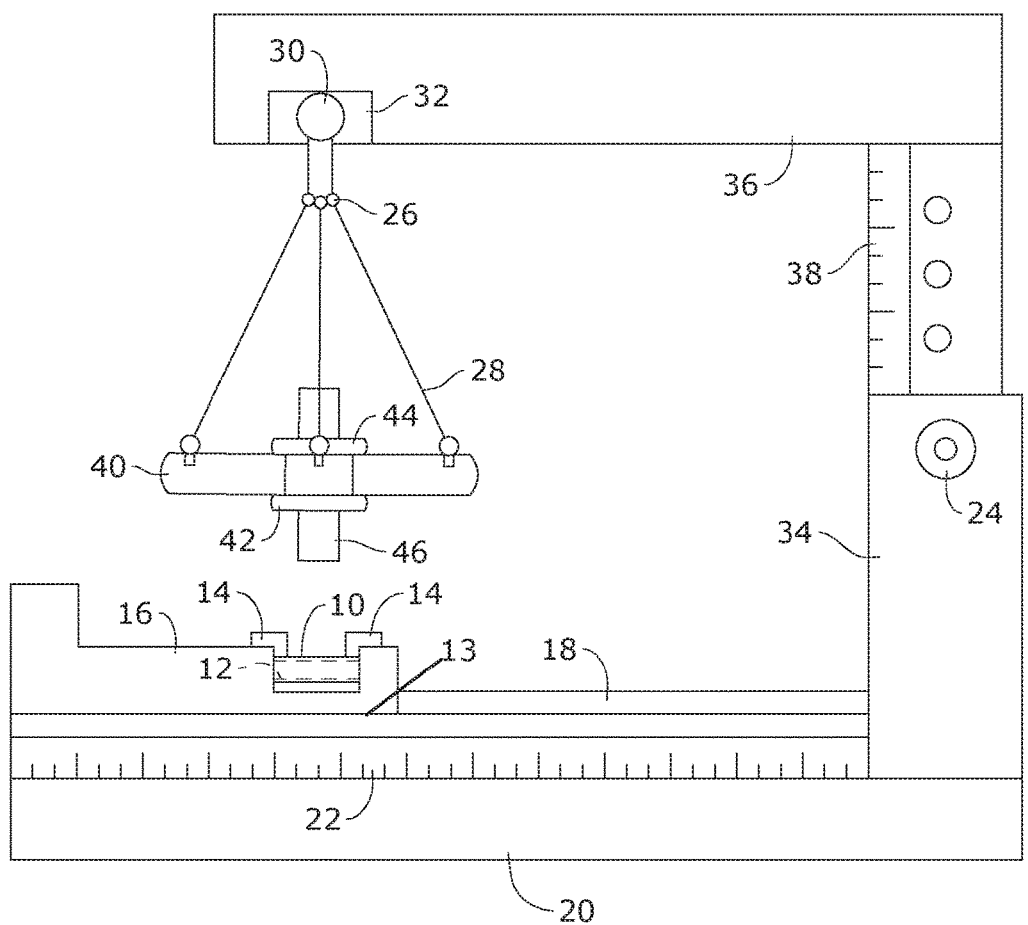
FIG. 1 is a side view of an embodiment of the present invention.
Figure 2:
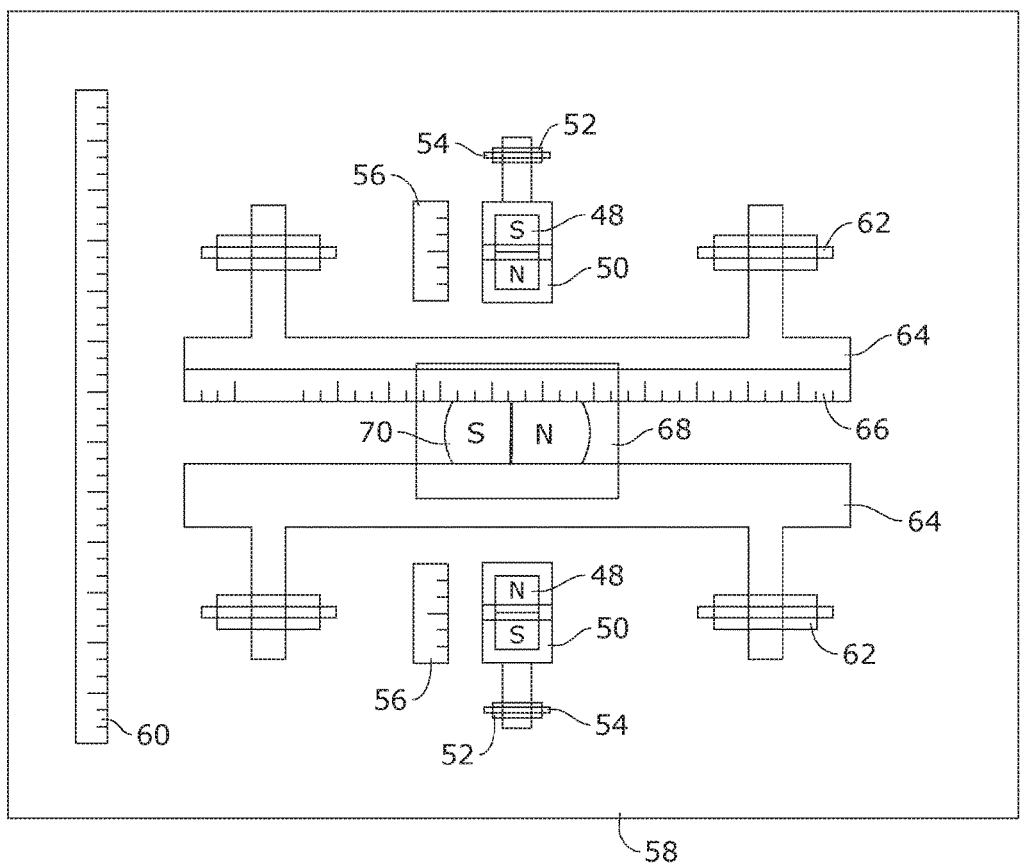
FIG. 2 is a top view of an embodiment of the present invention.
Figure 3:
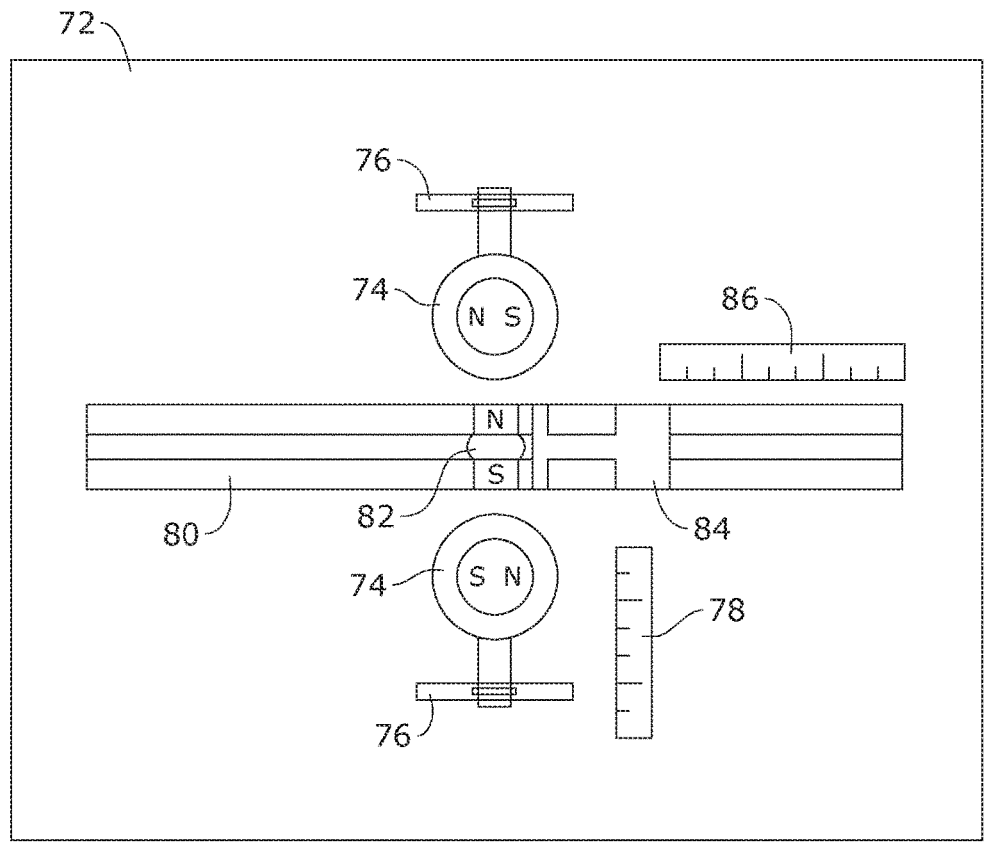
FIG. 3 is a top view of an embodiment of the present invention.

Referring to FIG. 1 through 3, the present invention includes an interactive black hole orbital simulator and measurement device, a black hole precession simulator and measurement device, and a black hole projector simulator and measurement device.

FIG. 1 illustrates the interactive black hole orbital simulator. The interactive black hole orbital simulator includes a base 20. The base 20 includes a first end, a second end, an upper surface and a lower surface. The upper surface includes a guide 18 running from the first send to the second end. The lower surface supports the simulator in an upright position when resting on a surface. A vertical shaft 34 extends from the second end of the base 20. A horizontal shaft 36 extends from a top end of the vertical shaft 34 towards the first end of the base 20. The present invention further includes a slide frame 16 and an orbital displacement disc 40. The slide frame 16 includes a bottom and a top. A rail 13 is formed on the bottom. The rail 13 slidably engages with the guide 18. A first magnet 10 is secured to the top. The orbital displacement disc 40 hangs from the horizontal shaft 36 above the slide frame 15 by at least one cord 28. The orbital displacement ring 40 includes a second magnet 46.

The slide frame 16 of the present invention includes armatures 14 forming an insert 12 therebetween. The first magnet 10 may be secured within the insert 12, thereby securing the first magnet 10 to the slide frame 16. The first magnet 10 of the present invention may include a diametrically magnetized ring. In certain embodiments, the present invention may include an orbital displacement gauge 22 disposed from the first end to the second end. The orbital displacement gauge 22 may be adhered or printed to a side of the base 20. The orbital displacement gauge 22 includes a plurality of measurement tick marks, allowing a user to gauge a position of the slide frame 16 on the guide 18.

In certain embodiments, the orbital displacement disc 40 is a disc suspended from the cord 28 so that the disc is substantially parallel with the base 20. In certain embodiments, the at least one cord 28 may include three cords 28 evenly spaced apart. Each cord 28 may be attached to a connector bearing 26 and each of the connector bearings 26 may be secured to a shaft bearing 30. The shaft bearing 30 is secured to the horizontal shaft 36 by a bearing insert 32. The shaft bearing 30 and the connector bearings 26 allow the orbital displacement disc 40 to rotate freely when the second magnet 46 and the first magnet 10 attract and repulse. The second magnet 46 may be a cylinder shaft and may be vertically secured to a central portion of the orbital displacement disc 40 by a connector 44 and an insert 42.

In certain embodiments, the vertical shaft 34 is expandable and retractable. Therefore, the distance between the orbital displacement disc 40 and the slide frame 16 may be increased and decreased. In such embodiments, a gravitational displacement gauge 38 is disposed along the vertical shaft 34. The gravitational displacement 38 may be adhered or printed to a side of the vertical shaft 34. The gravitational displacement gauge 38 includes a plurality of measurement tick marks, allowing a user to gauge a distance between the slide frame 16 and the orbital displacement disc 40. The vertical shaft 34 may be adjustable by way of telescoping members. A first telescoping member may include a plurality of openings that align with an opening of a second telescoping member. A pin lock 24 may fit through aligned openings of the first and second telescoping members, thereby locking them together in a fixed position.

FIG. 2 illustrates the interactive black hole precision simulator. The interactive black hole precision simulator includes a frame 58 having an upper surface. A first tilt regulator 64 and a second tilt regulator 64 are secured to the upper surface. Each of the tilt regulators 64 have arms protruding from a rear side. The arms are secured to the frame 58 by a guide and a guide pin 62. A channel is formed in between the first and second tilt regulators 64. Different positions of the arms may be secured to the guide and guide pins 62, which allows a user to adjust a distance between the tilt regulators 64 and thereby adjust a width of the channel. An angular tilt gauge 60 may be printed or adhered to the upper surface. The angular tilt gauge 60 includes a plurality of measurement tick marks, allowing a user to measure the width of the channel.

The interactive black hole precision simulator may further include a first magnet 48 and a second magnet 48. Each of the first and second magnets 48 may be secured within frames 50 that are secured to the upper surface by a guide 52 and a guide pin 54. The magnets 48 may be disposed outside of the channel and facing each other with like polarities are facing one another. An electromagnetic compression regulator gauge 56 may be printed or adhered to the upper surface adjacent to each of the first and second magnets 48. The electromagnetic compression regulator gauge 56 includes a plurality of measurement tick marks, allowing a user to gauge a position of the magnets 48 relative to the channel.

The interactive black hole precision simulator may further include a third magnet 70 disposed within a harness 68. The third magnet 70 may include a diametrically magnetized disc. The third magnet 70 may roll within the channel due to the attraction and repulsion of the first and second magnets 48. At least one of the tilt regulators 64 may include a disc displacement gauge 66. The disc displacement gauge 66 may include a plurality of measurement tick marks, allowing a user to measure a distance traveled by the third magnet 70 within the channel.

FIG. 3 illustrates the interactive black hole projector simulator and measurement device. The interactive black hole projector simulator and measurement device includes a frame 72 having an upper surface. A channel 80 may be formed on the upper surface. A first magnet 82, such as a disc magnet, may fit within the channel 80. A compression plate 84 may be slidably disposed within the channel 80. The interactive black hole projector simulator may further include a second magnet 74 and a third magnet 74. Each of the second and third magnets 74 may be secured to the upper surface by a guide and a guide pin 76. The magnets 74 may be disposed outside of the channel 80 and facing one another. An electromagnetic projection gauge 78 may be printed or adhered to the upper surface adjacent to each of the second and third magnets 74. The electromagnetic projection gauge 78 includes a plurality of measurement tick marks, allowing a user to gauge a position of the second and third magnets 74 relative to the channel 80. The first magnet 82 pushes the compression plate 84 along the channel when placed within the channel due to the attractive and repulsive forces of the second and third magnets 74. An electromagnetic output gauge 86 may be printed or adhered to the upper surface of the base 72 adjacent to the channel 80. The electromagnetic output gauge 86 may include a plurality of measurement tick marks, allowing a user to measure a distance traveled by the first magnet 82 within the channel 80.

Using the present invention, it is possible to derive logical conclusions about the nature of black holes based upon observational evidence, verified interactions, and intuitive reasoning. In this invention, each device can harness a measurement by simulating the interactions formed as a result of harnessing the proper physical and magnetic characteristics that a black hole projects and embodies based upon observational evidence, established science, as well a derived hypothesis. It is important to note that these devices may also harness photons, electromagnetic radiation, and synchrotron emissions when conducting a simulation, or taking a measurement just as a black hole in the cosmos would. Measurements may be taken in any fashion or order to achieve results.

Referring to FIG. 1, the interactive back hole orbital simulator. This invention simulates the orbital patterns of objects around a black hole. This is accomplished by forming gravitational displacement by harnessing the base 20 to replicate the displacement that a black hole forms against the fabric of spacetime. By harnessing a diametrically magnetized first magnet 10, this simulates the presence of a black hole by harnessing the magnetic projection and physical characteristics formed by a black hole. As the magnet driven by the orbital displacement disc 40 forms an orbital pattern because of engaging the slide 16 this allows you to take a measurement of the orbital displacement by utilizing the orbital displacement gauge 22. By adjusting the vertical shaft 34 this allows you to gauge how the variable effects of gravity affect the orbital patterns of objects as they encounter a black hole in the natural universe.

Referring to FIG. 2, the interactive black hole precession simulator. This invention simulates the precession cycles formed by a black hole. Only recently has this behavior been confirmed to exist by the NASA jet propulsion laboratory. It is also establishes that the angular tilt of a black hole is one of the few discernable characteristics of a black hole, which is why this device measures the angular tilt of a black hole by the angular tilt gauge 60. By gauging the angular tilt of a black hole, it is possible to determine how the angular momentum of a black hole affects its acceleration. To simulate the precession cycle, the presence of an accretion disc is simulated by harnessing the third magnet 70, which is a diametrically magnetized disc. The disc is diametrically magnetized because the diametrically magnetized objects form a timing differential in the entropic sequencing of the cosmos. To simulate gravitational compression and particle compression against a black hole, the first and second magnets 48 are aligned with like polarities pointed toward the diametrically magnetized disc. By adjusting the adjusting component 50 this allows a user to gauge the variable effects of particle compression and gravitational compression against a magnetic differential by utilizing the adjusting component 56. After releasing the harness 68 this allows a user to gauge the spin and acceleration of a black hole by utilizing component 66 to take a measurement. By adjusting component 50 it is possible to gauge how the variable effects of particle compression and gravitational compression affect the spin and acceleration of component 70 by utilizing the disc displacement gauge 66 to gauge the acceleration of the disc.

Referring to FIG. 3, which is the Black Hole Projection simulator. This device is utilized to simulate how the event horizon of a black hole forms a projection by harnessing the induction of particles. To accomplish this the second and third magnets 74 are aligned in a fashion which simulates the magnetic distortion formed by a diametrically magnetized object when it depresses the gravitational fabric of spacetime. Current computer simulations predict that this type of distortion at the event horizon is a distinct possibility. By adjusting the second and third magnets 74 when utilizing the guide pin 76 this allows a user to simulate how the variable conditions of the event horizon as it manipulates the fabric of spacetime around a black hole. The present invention allows a user to simulate and measure the induction rate of particles by regulating the amount of distance between the second and third magnets 74. Measuring the effects of this distortion is accomplished by utilizing the electromagnetic projection gauge 78 to measure the distance between the second and third magnets 74. Measuring the rate of induction is accomplished by utilizing the electromagnetic output gauge 86 to gauge the acceleration of the first magnet 82. By taking these measurements it is possible to determine how the variable effects of the event horizon influence a black holes' rate of induction when the event horizon expands and contracts as it does in the cosmos.

It should be understood, of course, that the foregoing relates to exemplary embodiments of the invention and that modifications may be made without departing from the spirit and scope of the invention as set forth in the following claims.

What is claimed is:

1. A black hole simulator comprising:
    a base comprising a first end, a second end, an upper surface and a lower surface, wherein the upper surface comprises a guide running from the first send to the second end and the lower surface supports the simulator in an upright position when resting on a surface;
    a vertical shaft extending from the second end of the base;
    a horizontal shaft extending from a top end of the vertical shaft towards the first end;
    a slide frame comprising a bottom and a top, wherein the bottom comprises a rail slidably engaged with the guide and the top comprises a first magnet; and
    an orbital displacement disc hanging from the horizontal shaft above the slide frame by at least one cord, wherein the orbital displacement disc comprises a second magnet.

2. The black hole simulator of claim 1, wherein the first magnet comprises a diametrically magnetized ring.

3. The black hole simulator of claim 1, wherein the second magnet comprises a cylinder shaped magnet centrally secured within the orbital displacement disc.

4. The black hole simulator of claim 1, wherein the at least one cord comprises three cords evenly spaced apart, wherein a bearing attaches the three cords to the horizontal shaft.

5. The black hole simulator of claim 1, further comprising an orbital displacement gauge disposed from the first end to the second end.

6. The black hole simulator of claim 1, wherein the vertical shaft is expandable and retractable.

7. The black hole simulator of claim 6, wherein the vertical shaft comprises telescoping members and a lock securing the telescoping members in a fixed position.

8. The black hole simulator of claim 6, further comprising a gravitational displacement gauge disposed along the vertical shaft.

* * * * *